3,058,872
FLEXIBLE ASBESTOS-CEMENT PRODUCTS

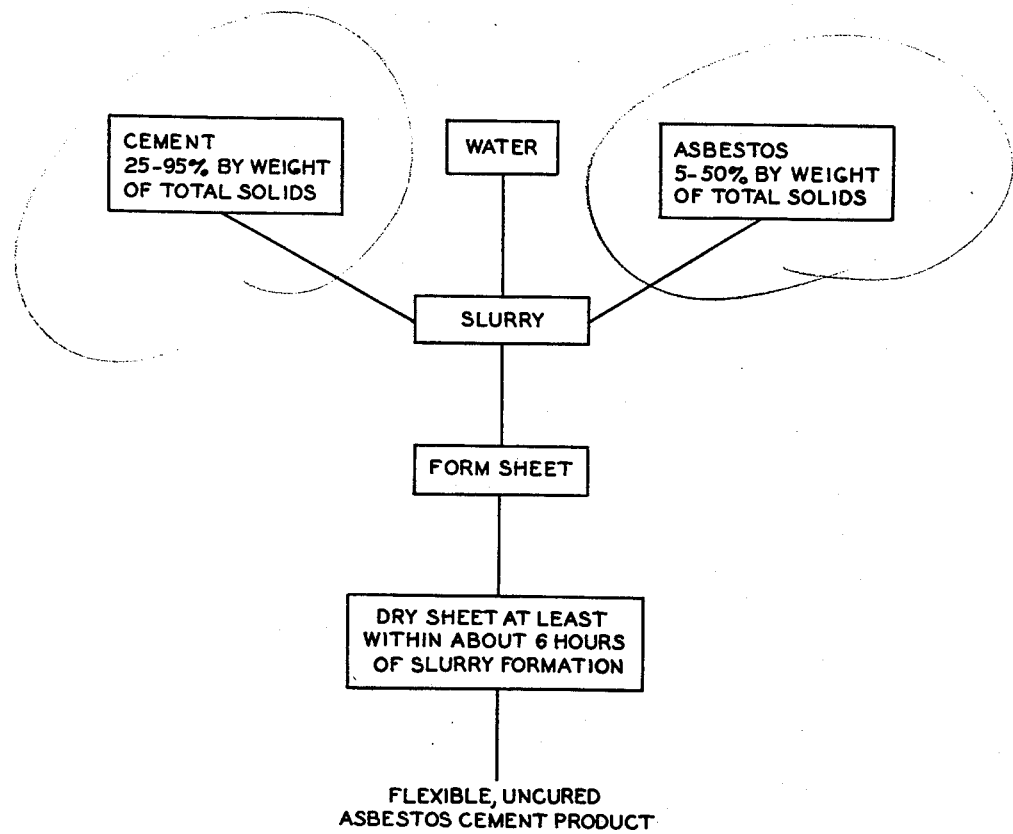

David A. Feigley, Jr., Lancaster Township, Lancaster County, and William M. Hawkins, Lancaster, Pa., assignors to Armstrong Cork Company, Lancaster, Pa., a corporation of Pennsylvania
Filed Nov. 16, 1960, Ser. No. 69,543
14 Claims. (Cl. 162—154)

This invention relates generally to asbestos-cement products, and more particularly to flexible, uncured, asbestos-cement sheets, boards, and other shaped objects. Still more particularly the invention relates to flexible asbestos-cement products having good tensile strength and wherein the cement is in a non-hydrated condition.

Asbestos-cement sheets and boards are widely used in the manufacture of shingles, siding units, corrugated roofing and siding, piping, and other products. All of the asbestos-cement products on the market are hydrated, and so are strong and tough. Since they possess little flexibility, they are all somewhat brittle and subject to breakage and shattering during handling and shipment.

It is the primary object of the present invention to present unhydrated asbestos-cement sheets and boards which may be shipped in the form of rolls from which the asbestos-cement products may be unwound, wetted, and cured to form any of the customary asbestos-cement products now on the market. It is another object of the present invention to present a process for making a flexible, uncured, asbestos-cement product having good tensile strength which may in turn be readily used for manufacturing a wide variety of cured asbestos-cement products. It is still another object of the present invention to present a flexible, unhydrated, asbestos-cement sheet product suitable for a wide variety of uses.

These objects are accomplished in a surprisingly simple and straightforward manner. The invention contemplates forming an aqueous slurry containing 90%–99.5% by weight water, the balance being solids comprising 5%–50% by weight asbestos fibers and 25%–95% by weight hydraulic cement. This slurry is passed to the drainage wire of a sheet-forming machine to form a sheet. The water is drained from the sheet and the sheet is dried immediately to a moisture content of less than about 5% by weight. The elapsed time between forming the slurry containing the hydraulic cement and drying the sheet containing the hydraulic cement should be less than about 6 hours to prevent hydration of the hydraulic cement. The resulting water-laid, flexible, asbestos-cement sheet is strong and possesses sufficient flexibility in thicknesses up to 3/16" that a sheet can be bent, without breaking, completely around a core having a diameter ten times the thickness of the sheet.

The attached drawing is a flow sheet illustrating the order of steps of the process of the present invention.

The asbestos to be used in the present invention may be chrysotile, crocidolite, amosite, or any of the other kinds of asbestos. The asbestos fibers will be those of the grade or length generally used in the manufacture of asbestos-cement products. The asbestos fibers may be used in an unbeaten condition, but it is generally preferred that the fibers be passed through a beater or other mechanical refiner such as a Jordan engine, disc refiner, and the like. This mechanical refining generally shortens the asbestos fibers and at the same time opens up the fibrils, thus reducing the diameters of the asbestos fibrous bundles. Where mechanical refining is used at all, it is preferred that the asbestos fibers be refined equivalent to that achieved in a laboratory Valley beater for 15 minutes with standard weights.

The amount of asbestos fibers to be used in the final product will vary between about 5%–50% by weight asbestos fibers and 50%–95% by weight hydraulic cement. Preferably the amount of asbestos fibers will be in the range of 10%–30% by weight of the end product. Unaccounted-for percentages in these ranges will be taken up by filler particles such as finely-divided silica.

The hydraulic cement will preferably be Portland cement, although other kinds of hydraulic cements, such as calcium aluminate cement, may be used.

It is often advantageous to incorporate with the asbestos fibers-hydraulic cement mixture a finely-divided silica. This is particularly true where the flexible asbestos-cement product of the present invention is ultimately to be steam-cured. When a silica is to be added to the mixture, it will generally be used in an amount up to 70% by weight of the final product, keeping in mind the above-stated limitations on the respective minimum amounts of asbestos fibers and hydraulic cement. With an average grade of Portland cement there will generally be used 30–70 parts of silica, preferably about 60, to each 100 parts by weight of the cement. A good grade of fine, clean sand is a satisfactory form of silica, although special silicas can be bought for the purpose of admixing with a hydraulic cement in the manufacture of asbestos-cement products.

If desired, pigments may be utilized in the manufacture of these products. Typical pigments are chrome oxide green, titanium dioxide, colored iron oxides, lead chromate, and the like.

The formation of the aqueous slurry may be readily accomplished in known manner. The asbestos fibers are placed in water in a suitable chest or container and are agitated to insure distribution throughout the system. Mechanical refinement is carried out if desired, usually at a consistency of 3%–6%. To a suitable chest or container in which the asbestos slurry is maintained with agitation is added the required amount of hydraulic cement. The cement is simply shoveled or otherwise tossed into the water in convenient manner during agitation in order that the cement may be distributed homogeneously throughout the entire slurry. As soon as the hydraulic cement is admixed with the water, a period of time starts to run, and accordingly, the time at which the cement is introduced into the asbestos slurry should be noted.

When the aqueous slurry containing the asbestos fibers, the hydraulic cement, the silica, if any, and the pigment, if any, is well mixed and homogeneous, the slurry is passed to the drainage wire of a sheet-forming machine such as a Fourdrinier machine or the like. The water drains through the wire leaving a wet web behind. This wet sheet will pass over the usual vacuum boxes and light rolls in order to remove additional amounts of water from the sheet and in order to insure that the sheet is sufficiently strong to proceed further down the sheet- or board-making machine. The white water may be recycled if desired.

The sheet travels through the usual drier section found on sheet-making machines. It is imperative in accordance with the present invention that the sheet be dried to a moisture content sufficiently low that no curing will take place. Generally less than 5% by weight water gives good results, while less than 1% by weight water, and even bone dryness, is preferred. If the drying sections of the sheet-making machine are inadequate to perform this drying at the desired speed, additional drying sections will be necessary. It has been found that drying for 4–5 hours at 195° F. is equivalent to drying for 25 minutes at 600° F. It is one of the main features of the present invention that the product contain no more than very small amounts of water in order that the hydraulic cement will have no opportunity to hydrate.

The period of time which elapses from the introduction of the hydraulic cement into the water as described earlier to the time when substantially all the water is driven off the product should be no longer than about 6 hours in order that the hydraulic cement be maintained in a non-hydrated condition. In order to maintain the desired and needed flexibility of the product of the present invention, the hydraulic cement may not be hydrated to any significant extent whatsoever. The exposure to water for a period of no more than about 6 hours will not hydrate the hydraulic cement in the asbestos-cement mixture in any measurable amount. The room temperature curing of asbestos-cement products normally runs about four weeks. About one week's time is necessary for the product to achieve some degree of stiffness during a room temperature cure. Thus it will be appreciated that 6 hours' exposure to water will not bring about any measurable cure or setting of the hydraulic cement. The point beyond which the cement should definitely not be allowed to remain in contact with water any longer is about 6 hours; undesirable stiffening of the asbestos-cement product becomes noticeable if the cement is exposed to water longer than this period of time.

The flexible asbestos-cement product of the present invention possesses surprising tensile strength, running generally about 30–150 pounds per square inch, depending on the formulation, for a flexible asbestos-cement felted sheet. The sheet possesses no structural strength as such since it is so very flexible, but it possesses sufficient tensile strength that it may be handled reasonably without fear of tearing or breaking or otherwise destroying the asbestos-cement felt. An asbestos-cement felt measuring 1/16" in thickness may readily be bent around a core having a diameter of 5/8" without any cracking or failure. In fact, the 1/16" asbestos-cement felt may be bent back on itself without breaking unless the actual bend is pinched or otherwise strongly pressed. This great flexibility constitutes one of the primary advantages of the product. As mentioned earlier, the test for the flexibility which is the hallmark of the product of the present invention is the ability of the dried product in thicknesses up to 3/16" to be tightly bent, without breaking, around a core or mandril having a diameter 10 times the thickness of the sheet.

Strips of the flexible asbestos-cement felt of the present invention may be wound on a mandril in a manner such that the edges of the strip butt against each other. Mere wetting and curing, either at room temperature or at elevated temperature, produce a tough, strong, hard, asbestos-cement pipe. Strips or sheets of the flexible asbestos-cement felt of the present invention may be wrapped or laid on odd and strange shapes and forms, wetted, and cured to form tough, shaped, asbestos-cement products.

Another advantage of the flexible, asbestos-cement felted sheets of the present invention results from an unexpected property of these sheets. Layers of the sheets may be placed one on top of the other and subjected to pressure in a suitable press to a pressure of about 100 to 5,000 pounds per square inch. Under these circumstances it has been found that a homogeneous laminate is formed, resulting apparently from the flow of the exceedingly fine hydraulic cement particles from one sheet into adjacent sheets. Subsequent wetting and cure of the laminate in any desired shape produces a tough, dense asbestos-cement product possessing the desired density and shape.

As mentioned above, the room temperature cure of these products is generally accomplished by room temperature aging in the presence of water or moisture for a period of about four weeks. Steam-curing may be accomplished if desired, for example at a pressure of 130 pounds per square inch of saturated steam for 16 hours. Higher steam pressures allow shorter periods of cure, and lower pressures require longer times.

It is sometimes advantageous to use additional additives during the formation of the flexible asbestos-cement product of the present invention. Such additives allow the production of a faster-draining sheet which may have greater tensile strengths on the sheet-forming machine and also in the dried, flexible form.

Where the additives are the solids in rubber latices, the drainage time of the asbestos-cement slurry is dramatically reduced. A further advantage of using relatively small amounts of rubber additives or binders is the clearing of the white water; little or no cement passes through the forming wire with the white water under these conditions, and thus recycling of the white water is completely unnecessary. The rubber binder is preferably added in the form of a latex. Typical of these rubber latices are, natural rubber, the products known as GR–S (SBR) which are copolymers of butadiene and styrene containing about 50% to about 70% butadiene. There may also be used the Buna N's or Hycars which are copolymers of butadiene and acrylonitrile containing about 50% to about 80% butadiene. The neoprenes may also be used. The neoprenes are polymers of 2-chloro-butadiene-1,3- which polymers are also known as polychloroprenes. If desired, homopolymers of butadiene may be employed as well as homopolymers and/or copolymers of butadiene homologues such as isoprene. These are the materials which are generally designated as rubber binders herein. They may be more specifically designated as, natural rubber, rubber-like polymers of butadiene, isoprene, and chloroprene, and rubber-like copolymers of butadiene or isoprene with copolymerizable vinyl compounds such as styrene and acrylonitrile. The latices normally contain about 25% to about 65% by weight rubber solids. The latices contain additional compounding ingredients such as stabilizers and the like which are well-known in the art and which form no part of the present invention.

The latices are simply poured into the asbestos-cement slurry. The aqueous phase of the slurry is sufficiently filled with ions that even precipitation of the rubber solids promptly takes place, and the rubber deposits on both the asbestos fibers and on the cement particles and filler particles, if any.

Where rubber additives are used at all, they are generally used in relatively small amounts, running about 0.5%–5% by weight of the final dried flexible asbestos-cement product. Although larger amounts may be used, such larger amounts begin to alter the ultimate properties of the final flexible asbestos-cement product.

As an aid in depositing the rubber it is frequently useful to employ the process fully described in U.S. Patent 2,759,813, Feigley, often called the citrate process. This process allows the particularly smooth and even deposition of rubbers from latices onto asbestos fibers in water, and is convenient for use in the present process wherever a rubber is used as an additive.

The following examples illustrate several embodiments of the invention. All parts are by weight unless otherwise stated.

*Example 1*

Into 4270 parts water was placed 32 parts chrysotile asbestos which had been beaten in a laboratory beater for 15 minutes. There were added 114 parts Portland cement and 68 parts finely-divided powdered silica having a particle size such that 95% passed through a 325 mesh screen, U.S. series.

Agitation was continuously carried out in the slurry.

The slurry was poured into a 12" x 12" hand mold having a sheet-making screen at the bottom. The slurry drained in 326 seconds forming a sheet of 0.150" thickness. The water running through the screen contained noticeable amounts of cement; the white water was cloudy.

After drainage, the sheet, without any wet pressing, was immediately placed in an oven maintained at 600° F. for 25 minutes. The time between the addition of the Portland cement to the water and the drying of the sheet to substantially complete dryness was approximately 3 hours. The resulting sheet was flexible and possessed a tensile strength of 30 pounds per square inch. The sheet measured .150" thick, and was flexible enough to bend around a round mandril of 1½" diameter.

When a portion of the flexible, dry, asbestos-cement sheet prepared as described immediately above was re-wetted with water, additionally pressed at 2500 pounds per square inch and allowed to remain at room temperature for 27 days, a tough, strong, dense cured asbestos-cement product resulted having a modulus of rupture of 5000 pounds per square inch and a density of 100 pounds per cubic foot.

*Example 2*

Into 4270 parts water was placed 32 parts chrysotile asbestos fibers having a size graded as 4T3, with agitation. There was then added four parts sodium citrate. When the sodium citrate had dissolved there was added 114 parts Portland cement and 68 parts silica. When the slurry was well mixed, there was added 22.5 parts of a neoprene latex containing 37.5% solids (neoprene 735). The rubber content of the latex precipitated on the fibers and particles. The drainage time of this slurry in a 12" x 12" mold was 44 seconds. The resulting sheet was stronger and smoother than the sheet prepared in Example 1 after drying at 600° F. for 25 minutes. The sheet was .150" thick and bent, without cracking, around a mandril 1½" in diameter.

*Example 3*

Two sheets were prepared as in Example 2 using the following formulation:

| Ingredients | Parts | Parts |
|---|---|---|
| Chrysotile asbestos | 32 | 32 |
| Sodium citrate | 4 | 4 |
| Portland cement | 114 | 114 |
| Silica | 68 | 68 |
| Butadiene-stryene copolymer latex (40% solids) | 21.4 | |
| Butadiene-acrylonitrile copolymer latex (41% solids) | | 20.9 |

The drainage time of the butadiene-styrene copolymer-containing sheet was 20 seconds. Drainage time of the butadiene-acrylonitrile-containing sheet was not recorded.

After drying, both sheets were completely flexible, possessed a tensile strength of 100 pounds per square inch, and could be bent around a core having a diameter of 1¼" without breaking. The thickness of the sheets was 0.125".

*Example 4*

The following two sheets were made:

| Ingredients | Parts | Parts |
|---|---|---|
| Asbestos | 10.7 | 107.0 |
| Sodium citrate | 4 | 4 |
| Portland cement | 127.1 | 66.9 |
| Silicon dioxide (finely-divided) | 76.2 | 40.1 |
| Butadiene-stryene copolymer latex | 21.4 | 21.4 |
| Drain time | 29 sec. | |

Both sheets were flexible and strong, the sheet containing the higher amount of asbestos possessing a higher tensile strength and increased flexibility. Both sheets cured to stiff, hard, strong boards when placed in an autoclave and treated with saturated steam at 130 pounds per square inch for 16–18 hours.

*Example 5*

A flexible, dried sheet was prepared from 10.7 parts chrysotile asbestos fibers, 53.5 parts Portland cement and 149.8 parts finely-divided silica. The sheet was flexible but was not as strong as the sheet prepared in Example 1. On wetting and green curing for 27 days at room temperature, it hardened to a brittle, hard, strong board.

*Example 6*

Two thick sheets were prepared from the following ingredients:

| Ingredients | Parts | Parts |
|---|---|---|
| Water | 8,500 | 8,500 |
| Chrysotile asbestos | 64 | 64 |
| Sodium citrate | 4.3 | |
| Portland cement | 225.8 | 225.8 |
| Silica, powdered | 135.5 | 135.5 |
| Butadiene-stryene copolymer latex admixed with | 21.3 | |
| Potassium salt of dimer acid (dilinoleic acid) in water solution | 26.5 | |

Both slurries were poured into a wooden box mold having a screen at the bottom. The rubber-containing sheet formed a board about 1½" thick after draining for about one-half hour.

The dried board containing the rubber had flexibility and could be easily handled. On remoistening and green curing for 28 days at room temperature, a tough, hard, strong board resulted.

The board that did not contain rubber measured about 1¼" thick and had flexibility. The asbestos used in this board was unrefined asbestos, that is, it had not been subjected to any kind of mechanical refining after being received from the mine. This board, too, cured to a hard, strong asbestos-cement product.

*Example 7*

A sheet was made of the following ingredients.

Ingredients: Parts
  Water _____ 2140
  Chrysotile asbestos _____ 16
  Portland cement _____ 57
  Silica, powdered _____ 34
  Water-soluble polyacrylamide (Separan NP-10) _____ 0.02

The white water was free of cement and silica. Drainage time was 96 seconds. Drying time was 4 hours at 195° F. The dried sheet was felt-like in its flexibility.

*Example 8*

The following formula produced strong, flexible sheets:

| Ingredients | Parts | Parts |
|---|---|---|
| Water | 1,066 | 1,800 |
| Crocidolite asbestos (Blue African) | 8 | 26.5 |
| Portland cement | 28 | 10 |
| Silica | 17 | |
| Aromatic sulfonate, wetting agent (Tamol N) | 1.8 | |
| Butadiene-stryene copolymer latex, 40% solids | 5.4 | 5.4 |

*Example 9*

The following two formulas produced strong, flexible sheets when made as in Example 2:

| Ingredients | Parts | Parts |
|---|---|---|
| Chrysotile asbestos | 37.5 | 37.5 |
| Portland cement | 114 | 114 |
| Silica | 68 | 68 |
| Sodium citrate | 3 | 3.2 |
| Natural latex (stabilized with ammonia and sodium pentachlorophenate, 62.7% solids) | | 12.0 |
| Natural latex (stabilized with ammonia alone, 34.5% solids) | 21.7 | |
| Precipitation time, minutes | 6 | 6 |
| Canadian 3-gram freeness | 650 | 630 |

We claim:
1. A process of forming an uncured water-laid flexible sheet of asbestos-cement which comprises forming an aqueous slurry containing 90%–99.5% by weight water, the balance being solids comprising 5%–50% by weight asbestos fibers and 25%–95% by weight hydraulic cement, passing the slurry to the drainage wire of a sheet-forming machine to form a sheet, draining the water from the sheet, and drying the sheet to a moisture content of less than 5% by weight to produce an asbestos-cement sheet having sufficient flexibility up to a thickness of 3/16" to be bent, without breaking, around a core having a diameter ten times the thickness of the sheet, the elapsed time between forming the slurry containing the hydraulic cement and drying the sheet containing the hydraulic cement being being less than about 6 hours to prevent substantial hydration of the hydraulic cement.

2. A process according to claim 1 wherein said hydraulic cement comprises Portland cement.

3. A process according to claim 1 wherein finely-divided silica is added to the slurry in addition to the asbestos fibers and hydraulic cement.

4. A process according to claim 3 wherein the silica is added in an amount of 30–70 parts by weight per 100 parts by weight of the hydraulic cement.

5. A process according to claim 1 wherein a rubber latex is added to the slurry to deposit the rubber content of the latex on the fibers and the cement prior to passing the slurry to the drainage wire.

6. A process according to claim 5 wherein the rubber is added in an amount of 0.5%–5% by weight based on the weight of the final sheet.

7. A process according to claim 1 wherein said asbestos fibers are used in an amount of about 10%–30% by weight.

8. An uncured, water-laid, flexible asbestos-cement sheet comprising 5–50% by weight asbestos fibers and 25–95% by weight of substantially non-hydrated hydraulic cement, said flexible sheet containing less than 5% by weight water and possessing sufficient tensile strength to be handled and sufficient flexibility at a thickness up to 3/16" to be bent, without breaking, around a core having a diameter ten times the thickness of the sheet, said flexible sheet forming a hydrated, tough, strong asbestos-cement product on being wetted with water and cured.

9. A product according to claim 8 wherein said hydraulic cement comprises Portland cement.

10. A product according to claim 8 containing finely-divided silica.

11. A product according to claim 10 containing 30–70 parts by weight silica per 100 parts by weight hydraulic cement.

12. A product according to claim 9 containing 10%–30% by weight asbestos fibers.

13. A product according to claim 8 having a rubber deposited on at least a portion of the surfaces of the fibers and the cement.

14. A product according to claim 13 wherein the rubber is present in an amount of 0.5%–5% by weight based on the weight of the product.

References Cited in the file of this patent

UNITED STATES PATENTS

| | | |
|---|---|---|
| 1,544,843 | Ledeboer | July 7, 1925 |
| 1,872,480 | Maust | Aug. 16, 1932 |
| 2,348,804 | Gerity | May 16, 1944 |
| 2,791,159 | Lillis | May 7, 1957 |

FOREIGN PATENTS

| | | |
|---|---|---|
| 655,538 | Great Britain | July 25, 1951 |

UNITED STATES PATENT OFFICE
CERTIFICATE OF CORRECTION

Patent No. 3,058,872            October 16, 1962

David A. Feigley, Jr., et al.

It is hereby certified that error appears in the above numbered patent requiring correction and that the said Letters Patent should read as corrected below.

In the grant (only), line 2, for "William M. Howkins" read -- William M. Hawkins --; column 4, line 21, for "-1,3-" read -- -1,3 --; column 5, in the table of Example 3, first column, line 5 thereof, same column, in the table of Example 4, first column, line 5 thereof, column 6, in the table of Example 6, first column, line 6 thereof, and same column 6, in the table of Example 8, first column, line 6 thereof, for "-stryene", each occurrence, read -- -styrene --; same column 6, line 44, for "formula" read -- formulas --; column 7, line 8, strike out "being", second occurrence.

Signed and sealed this 19th day of March 1963.

(SEAL)
Attest:

ESTON G. JOHNSON
Attesting Officer

DAVID L. LADD
Commissioner of Patents